United States Patent Office 2,927,055
Patented Mar. 1, 1960

1

2,927,055

AIR TREATING GEL AND METHOD OF PREPARING THE SAME

Monroe Lanzet, Bronx, N.Y., assignor to Airkem, Inc., New York, N.Y., a corporation of New York No Drawing. Application September 5, 1958
Serial No. 759,137

3 Claims. (Cl. 167—42)

This invention relates to air treating gels wherein an aqueous medium containing readily volatilizable air treating constituents is solidified by means of a small amount of aqueous gelling agent. More particularly, the invention relates to an improved formulation of gelling agent for use in the preparation of air treating gels of the character described.

The general type of air treating gel with which the present invention is concerned has been disclosed in United States Patent No. 2,691,615, dated October 12, 1954. Such air treating gels are there described and claimed as consisting of 96 to 99% of an aqueous medium of which 1 to 10% comprises a plurality of volatile air treating components which are compatible, uniformly dispersible in water, and which normally volatilize at different rates at room temperature, and 1 to 4% of an aqueous gelling agent, the amount of gelling agent present in proportion to the aqueous medium being such that the gel is firm and substantially devoid of syneresis. It is also pointed out in said patent that a distinct advantage in the air treating gel over the previously known air treating compositions in liquid form is that the slow diffusion of liquid composition to the surface thereof for evaporation so retards and controls the evaporation that vapors of substantially uniform quality or composition are emitted during the useful life of the gel, i.e. during the period from initial exposure to air to the time when the aqueous medium containing volatile components has been substantially dissipated from the gel. The use of such gels for introducing mixtures of volatile air treating materials into air has been particularly advantageous in the field of air freshening and deodorization when treating air in rooms or other confined spaces.

One of the practical problems which has been encountered with air treating gels prepared in accordance with said patent is that it has been difficult to provide satisfactory gels at costs competitive with other air treating compositions, such as liquids for spray or wick bottle dispensers, aerosol sprays, and the like, due in part to the cost of gelling agent and in part to production problems when using a minimum amount of gelling agent. For example, when using agar-agar, the gelling agent of choice according to the disclosure in said patent, in economically practical amounts, the time required for full hydration of the gelling agent, and the time required to properly set the gel becomes sufficiently long to substantially increase production costs, and increasing the amount of gelling agent to overcome the slow setting time involves additional material costs which tend to offset the advantages of improved production, and substantially increases the time required for hydration of the gelling agent.

It has now been discovered in accordance with the present invention that substantial savings both in material costs and production costs can be achieved while at the same time producing air treating gel of superior appearance and quality by employing as gelling agent a novel formulation of carrageenan, locust bean gum, and

2 potassium chloride, in conjunction with a small amount of sodium carboxymethylcellulose. Regarded in certain of its broader aspects the improved air treating gel composition, in accordance with the present invention, consists essentially of 97 to 98% of an aqueous medium of which 1 to 10% comprises a plurality of volatile air treating components which are compatible, uniformly dispersible in water, and which normally volatilize at different rates at room temperature, and about 2 to 3% of an aqueous gelling agent. Expressed in terms of percent by weight of the complete gel formulation, the proportions of the separate components of the gelling agent are approximately .75 to 1.8% carrageenan, .2 to .75% locust bean gum, .1 to .75% potassium chloride, and 0.15 to 0.7% sodium carboxymethylcellulose. The analysis of a preferred formulation of gelling agent is approximately locust bean gum 0.25%, carrageenan 1.5%, potassium chloride 0.5%, and sodium carboxymethylcellulose 0.25%.

In this new formulation of gelling agent the selection of components and proportions of components is quite critical. Locust bean gum is preferably employed in the lower amount of the range noted above, i.e. about 0.25% of the complete gel formulation. Increased amounts of locust bean gum provide a somewhat firmer gel but also adds appreciably to the viscosity of the molten gel, making handling thereof in the molten state somewhat more difficult. In instances where extra firmness in the gel is important, however, use of appropriate higher proportions of locust bean gum up to about 0.75% may be warranted.

The 1.5% of carrageenan (Irish Moss Extractive) based on the total weight of gel is considered to be the optimum amount, although a slight increase or decrease in the amount of carrageenan may be desirable in the formulation of particular gels.

The 0.5% of potassium chloride is also considered to be an optimum amount, and while some variation in this amount can be made in special gel formulations, it should be noted that increasing the amount of potassium chloride tends to increase syneresis, whereas decreasing the amount of potassium chloride tends to reduce the hardness or firmness of the gel.

Sodium carboxymethylcellulose provides a distinct advantage in instances where air treating gels are subject to freezing since the sodium carboxymethylcellulose tends to prevent physical change or alteration in the gel if it is frozen. In addition, the sodium carboxymethylcellulose reduces the viscosity of the gel in the molten state, without impairing the firmness of the solidified gel.

In preparing air treating gels in accordance with the present invention the components of the gelling agent are preferably first blended together in the dry state and then added to cold water which is heated with stirring to 180°–190° F. until the solids are totally dispersed. The aqueous dispersion is cooled to about 170° F. and the pre-blended air treating components are added with stirring until a clear composite dispersion results, which dispersion is then transferred to separate or continuous molding means, with cooling, to produce formed gel masses.

The locust bean gum-carrageenan gelling action (or resulting gel structure) appears to be somewhat different than that provided with agar-agar for a number of reasons. The gel sets much more rapidly upon cooling from the molten state, although it is completely reversible upon again heating to elevated temperature.

There appears to be a greater dispersion or reduction in particle size of essential oils incorporated as volatile components of the gel with the result that the gel is more transparent, and has greater light transmission than a corresponding gel made with agar-agar. When chlorophyll is present in a gel to be used for air freshening, a distinctly greener color is obtained than would be obtained in the same formulation solidified with agar-agar as a gelling agent. The behavior of the gel when evaporated to introduce volatile components into air correponds quite closely with the behavior on evaporation of an agar gel, and while tests in this direction have not been completed as yet, it is expected, in view of the improved physical characteristics of the carrageenan-locust bean gel, that certain superiorities in performance over the agar gel will come to light.

Of primary importance from a practical standpoint is that gelling components for the carrageenan locust bean gum gel are about 50% cheaper than for an agar gel, and the production time is reduced to about 25 to 40% of the production time required with an agar gel. This reduction in production time provides more than the direct or obvious economy in production since it makes possible quite different and much more economical methods in the production and packaging of gel, whether by a continuous molding or extruding process, or by intermittent molding in forms which may be the package or container for the gel.

The carrageenan-locust bean gum gelling formulation may be utilized in the preparation of many types of air treating gels adapted for the introduction of mixtures of active volatile components into air. Thus, while of particular importance in the preparation of gels for air freshening and odor counteraction, the improved gelling agent can be used in the preparation of gels having insect repellent properties, gels for the emission of controlled scents or perfumes, and the like.

The following examples will serve to indicate how typical gel formulations in accordance with the present invention can be prepared, but it is to be understood that these examples are given by way of illustration and not of limitation.

Example I

An air treating gel for air freshening and odor counteracting in confined spaces is prepared having the folowing composition, the amounts being expressed in percent by weight of the complete gel:

| Air treating components: | Percent |
| --- | --- |
| Essential oil mixture | 3 |
|   Oil of pine —————— 50% | |
|   Oil of wintergreen ———— 25% | |
|   Oil of lemon grass ———— 25% | |
| Isopropyl alcohol (99% grade) | 4 |
| Ethylene glycol | 2 |
| Water-soluble chlorophyllin | 0.1 |
| Gelling agent components: | |
|   Locust bean gum | 0.25 |
|   Carrageenan | 1.5 |
|   Potassium chloride | 0.5 |
|   Sodium carboxymethylcellulose | 0.25 |
| Water, balance to 100%. | |

The gelling components are first blended together in the dry state and added to cold water which is then heated to 180–190° F. with stirring until the solids are totally dispersed, at which time the aqueous dispersion is allowed to cool to about 170° F. The air treating components are blended together to provide a uniform mixture and added to the warm aqueous dispersion with mixing until a clear composite dispersion results while maintaining a temperature of about 170° F. The resulting dispersion is then poured into molds and allowed to cool to room temperature. Alternatively, the dispersion can be passed through an elongated cooled tube of cylindrical or other desired contour to be discharged from the other end thereof as a continuous formed body of gel which can readily be cut or severed into slugs or pieces of desired size.

Example II

An air freshening gel is prepared having the following composition, the amounts being expressed in percent by weight of the complete gel:

| Air treating components: | Percent |
| --- | --- |
| Essential oil mixture | 2 |
|   Oil of lemon grass ———— 40% | |
|   Oil of cedarwood ———— 25% | |
|   Oil of fir Canadian ———— 20% | |
|   Amyl acetate ———— 5% | |
|   Phenyl acetaldehyde ———— 10% | |
| Isopropyl alcohol | 4 |
| Ethylene glycol | 2 |
| 2.5% aqueous sodium chlorophyllin | 1 |
| Gelling agent components: | |
|   Carrageenan (Irish Moss Extractive) | 0.75 |
|   Locust bean gum | 0.20 |
|   Potassium chloride | 0.75 |
|   Sodium carboxymethylcellulose | 0.30 |
| Water | 88 |

The gelling components are added to the water as in Example I while heating to a temperature somewhat in excess of 60° C. When the gelling agents are dispersed, the mixture is cooled to about 60° C., and the air treating components are added with stirring until a uniform dispersion is obtained. The resulting dispersion is then poured into suitable molds or subjected to continuous cooling and molding as described in Example I.

Example III

An air freshening gel is prepared having the following composition, the amounts being expressed in percent by weight of the complete gel:

| Air treating components: | Percent |
| --- | --- |
| Essential oil mixture (same formulation as in Example II) | 3 |
| Isopropyl alcohol | 4 |
| Ethylene glycol | 2 |
| 2.5% aqueous sodium chlorophyllin | 1 |
| Gelling agent components: | |
|   Carrageenan | 1.8 |
|   Locust bean gum | 0.2 |
|   Potassium chloride | 0.1 |
|   Sodium carboxymethylcellulose | 0.9 |
| Water | 87 |

The gelling agent components are first dissolved in water with heating as described in the previous examples. The air treating components are then combined and added to the warm mixture with stirring until a uniform dispersion is obtained. Thereafter, the dispersion is poured into molds and cooled or subjected to continuous forming and cooling as described in Example I.

Various changes and modifications in the air treating gel formulations herein disclosed will occur to those skilled in the art, and to the extent that such changes and modifications are embraced by the appended claims, it is to be understood that they constitute part of my invention.

I claim:

1. In an air treating gel adapted for introducing into the air a uniform quality vapor mixture, said gel consisting essentially of 97 to 98% of an aqueous medium of 1 to 10% comprises a plurality of volatile air treating components which are compatible, uniformly dispersible in water, and which normally volatilize at different rates at room temperature, and a small amount of aqueous gelling agent, the improvement that comprises employing as said aqueous gelling agent about 2 to 3% of a mixture of the following components in amounts expressed as percent by weight of the complete gel formulation:

| | Percent |
|---|---|
| Carrageenan | 0.75 to 1.8 |
| Locust bean gum | 0.2 to 0.75 |
| Potassium chloride | 0.1 to 0.75 |
| Sodium carboxymethylcellulose | 0.15 to 0.7 |

2. In an air treating gel adapted for introducing into the air a uniform quality vapor mixture, said gel consisting essentially of 97.5% of an aqueous medium of 1 to 10% comprises a plurality of volatile air treating components which are compatible, uniformly dispersible in water, and which normally volatilize at different rates at room temperature, and a small amount of aqueous gelling agent, the improvement that comprises employing as said aqueous gelling agent about 2.5% of a mixture of the following components in amounts expressed as percent by weight of the complete gel formulation:

| | Percent |
|---|---|
| Carrageenan | 1.5 |
| Locust bean gum | 0.25 |
| Potassium chloride | 0.5 |
| Sodium carboxymethylcellulose | 0.25 |

3. The process for preparing an air treating gel as defined in claim 1 that comprises separately blending together the gelling agent components and the air treating components, adding the dry-blended gelling agent components to cold water and stirring, while heating to about 180°–190° F. until the solids are totally dispersed, cooling the aqueous dispersion to about 170° F. and adding the pre-blended air treating components with stirring until a uniform composite dispersion is obtained, and transferring the composite dispersion to molding means, with cooling, to produce formed gel masses.

References Cited in the file of this patent

UNITED STATES PATENTS 2,691,615 Turner et al. ---------- Oct. 12, 1954